Patented Mar. 3, 1931

1,794,903

UNITED STATES PATENT OFFICE

LOUIS CLEVELAND JONES, OF GREENWICH, CONNECTICUT, ASSIGNOR TO CHEMICAL ENGINEERING CORPORATION, OF NEW YORK, N. Y., A CORPORATION OF DELAWARE

PROCESS FOR PURIFYING THE NITROGEN-HYDROGEN MIXTURE IN THE SYNTHESIS OF AMMONIA

No Drawing.    Application filed April 2, 1927.  Serial No. 180,617.

My invention relates generally to the synthetic manufacture of ammonia from its elements and is particularly adapted to improved processes for purifying the gaseous mixture of hydrogen and nitrogen in the manufacture of anhydrous ammonia.

After compressing mixtures of nitrogen and hydrogen in combining proportions in the process of making synthetic ammonia, the gas mixture still contains, in addition to other impurities, certain amounts of moisture in equilibrium at the pressure and temperature involved. This moisture acts injuriously upon the ammonia catalyst and when anhydrous ammonia is produced causes contamination of product.

At pressures above 100 atmospheres, the amount of this moisture is necessarily small, but it is considered important to remove it which has been done by refrigeration, washing with liquid anhydrous ammonia, or by other means.

The make-up gas mixture is usually freed as far as possible from carbon dioxide by washing in caustic soda or otherwise since this, too, is an injurious impurity.

In industrial practice, therefore, it is extremely advantageous in securing satisfactory yields to remove, if possible, even the last traces of these harmful impurities from the nitrogen-hydrogen mixture before treating same catalytically.

I have found that both these impurities and also others, such as oil particles and dust, can be effectively removed in the solid form by introducing into the make-up gas current predetermined amounts of carbon dioxide which will react with the ammonia present to produce solid ammonium carbonate. In this way, both the carbon dioxide and moisture also are removed from the gas current according to the following reaction:

$$2NH_3 + CO_2 + H_2O = (NH_4)_2CO_3$$

The amount of moisture concerned in this reaction is necessarily small, since gas at 100 atmospheres pressure, saturated with water vapor at 20° C., contains (by volume) only about 1 part of moisture to 30000 parts of gas. Therefore, the same amount of carbon dioxide is required to remove this water with the formation of ammonium carbonate.

Ordinarily, unless this carbon dioxide is completely removed, the solid ammonium carbonate formed will ultimately cause difficulty by stoppage in the system of piping.

However in my process, an enlargement in the circulating system causing interruption of the gas current and containing surface-giving material may be advantageously utilized to provide for the solid materials deposited.

In actual practice, I have found that the deposition of this solid matter brings down with it any other solid or liquid impurities present in the gas current such as particles of oil and dust, all of which are thereafter removed.

My improved process is carried out in practice by bringing the carbon dioxide containing gas into the circulating system containing the gas mixture for use in the synthesis of ammonia immediately preceding or directly into an enlargement in the circulation system after compression but before catalysis. This enlargement may consist of any suitable chamber filled with Raschig rings or similar baffling or filtering material which will cause the deposit of the solid or liquid impurities without stoppage of the gas current which is thereby freed from such injurious substances. Two such enlargements arranged in parallel will advantageously permit convenient cleaning of one while the other remains in operation.

The essential features of my process, therefore, involve the introduction of small but controlled amounts of carbon dioxide into the gases under pressure in order to produce a solid compound containing moisture which compound also removes the carbon dioxide introduced as well as other solid and liquid impurities such as oil and dust particles, such impurities in solid form being removed from the gases in circulation before production of ammonia. The amount of carbon dioxide should not exceed one-half by volume the ammonia in the gases in circulation.

I claim as my invention:

1. In the process of purifying the nitrogen-hydrogen mixture for the production of ammonia by circulating the gases under pressure in contact with a catalyst, the steps which comprise introducing carbon dioxide into the circulating system after compression and before catalysis to react with gases whereby impurities in the system are produced in solid form, and simultaneously removing such solidified impurities including carbon dioxide from the gas mixture so purified while maintaining a continuous circulation of the gases under pressure through said system as the purified gas mixture passes on to catalysis.

2. In the process of purifying the nitrogen-hydrogen mixture for the production of ammonia by circulating the gases under pressure in contact with a catalyst, the steps which comprise introducing carbon dioxide not to exceed one-half by volume the ammonia in the gases in circulation into said nitrogen-hydrogen mixture containing water vapor and other impurities after compression and before catalysis to react with said gases and water vapor in a surface-giving chamber connected with the circulating system to form ammonium carbonate, thereafter passing the purified gas mixture freed from said impurities and ammonium carbonate to catalysis, and also removing from said chamber the solid compounds deposited therein with the ammonium carbonate while maintaining a continuous circulation of the gases under pressure through said system.

3. In the process of purifying the nitrogen-hydrogen mixture for the production of ammonia by circulating the gases under pressure in contact with a catalyst, the step which comprises continuously introducing controlled amounts of carbon dioxide into the gas circulating system under high pressure but before catalysis to react with the gases whereby impurities are produced in solid form while passing the purified gas mixture to catalysis removing the solid impurities so formed and also maintaining a continuous circulation of the gases under pressure through said system.

LOUIS CLEVELAND JONES.